(12) United States Patent
Heilig

(10) Patent No.: US 6,357,785 B1
(45) Date of Patent: Mar. 19, 2002

(54) GAS BAG MODULE FOR A VEHICLE OCCUPANT RESTRAINT SYSTEM

(75) Inventor: Alexander Heilig, Waldstetten (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/625,670

(22) Filed: Jul. 26, 2000

Related U.S. Application Data

(63) Continuation-in-part of application No. 09/203,873, filed on Dec. 2, 1998, now abandoned.

(30) Foreign Application Priority Data

Aug. 12, 1997 (DE) ..................................... 297 21 682 U

(51) Int. Cl.[7] ............................................... B60R 21/16
(52) U.S. Cl. ................... 280/728.2; 280/732; 280/743.1
(58) Field of Search .............................. 280/728.2, 732, 280/728.3, 743.1

(56) References Cited

U.S. PATENT DOCUMENTS

| | | | | |
|---|---|---|---|---|
| 5,074,583 A | * | 12/1991 | Fujita et al. ............ 280/732 X |
| 5,344,184 A | * | 9/1994 | Keeler et al. ............ 280/732 X |
| 5,876,063 A | * | 3/1999 | Wier | |
| 5,899,488 A | * | 5/1999 | Muller ..................... 280/728.3 |
| 5,975,566 A | * | 11/1999 | Bocker et al. | |
| 6,068,286 A | * | 5/2000 | Heilig ...................... 280/728.3 |
| 6,161,864 A | * | 12/2000 | Heilig ................. 280/728.3 X |

FOREIGN PATENT DOCUMENTS

| DE | 4217174 | * 11/1993 |
|---|---|---|
| DE | 4217177 | * 11/1993 |

* cited by examiner

Primary Examiner—Brian L. Johnson
Assistant Examiner—Bryan Fischmann
(74) Attorney, Agent, or Firm—Tarolli, Sundheim, Covell, Tummino & Szabo L.L.P.

(57) ABSTRACT

A gas bag module for a vehicle occupant restraint system having a housing adapted to be mounted beneath a vehicle instrument panel, a gas bag arranged in the housing, a gas generator in flow connection with the gas bag, a covering connected with the housing, and a device for displacing the housing in a direction opposite the vehicle interior during inflation of the gas bag. The covering extends over the housing and the cover and the instrument panel form a continuous surface. The covering opens after activation of the gas generator to permit the gas bag to emerge from the housing. The displacement of the housing opens the covering.

11 Claims, 2 Drawing Sheets

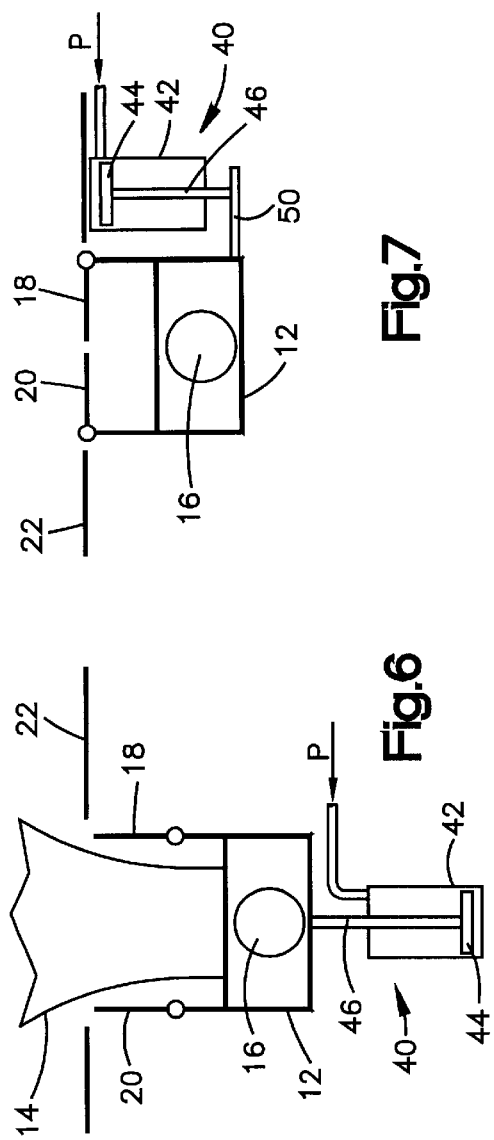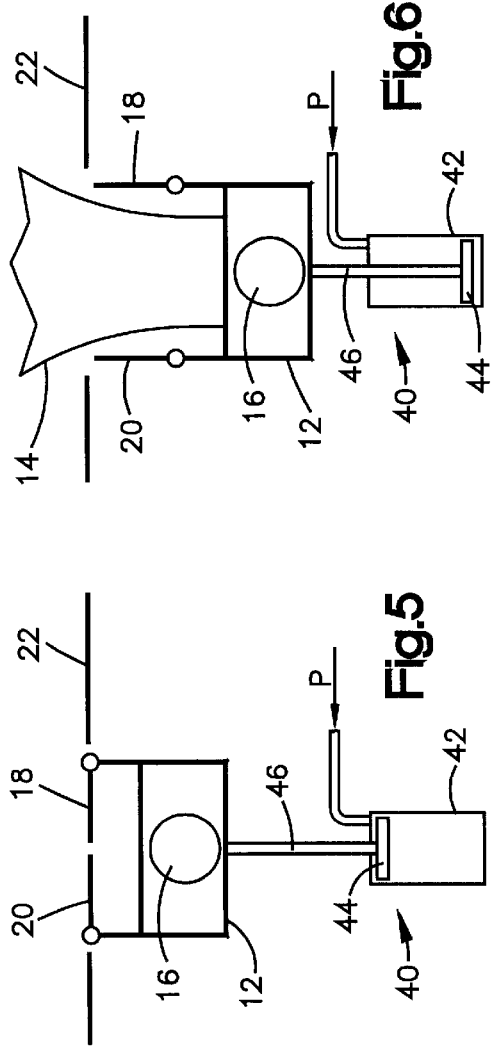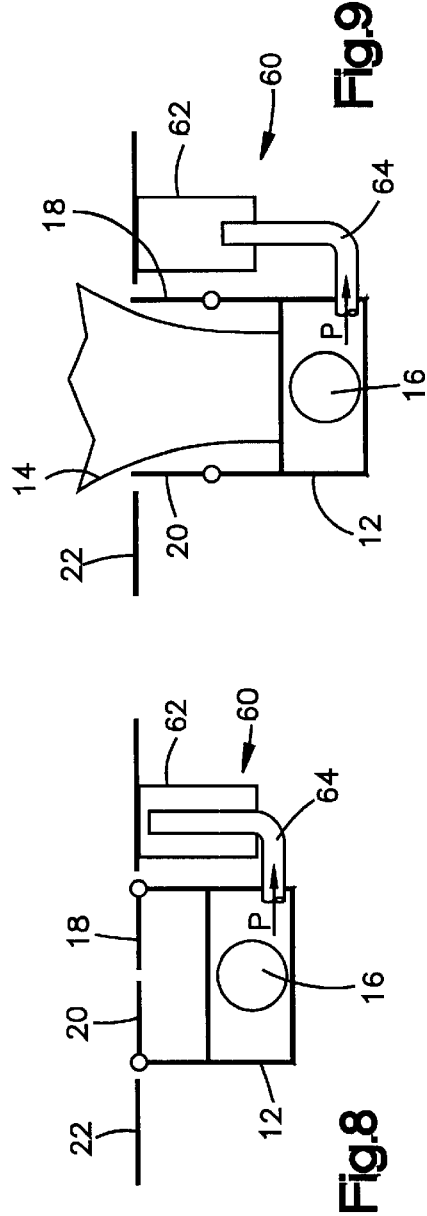

GAS BAG MODULE FOR A VEHICLE OCCUPANT RESTRAINT SYSTEM

RELATED APPLICATIONS

This application is a continuation-in-part of U.S. patent application Ser. No. 09/203,873, filed Dec. 2, 1998, now abandoned.

FIELD OF THE INVENTION

The invention relates to a gas bag module for a vehicle occupant restraint system.

BACKGROUND OF THE INVENTION

Such gas bag modules comprise a housing arranged on the vehicle, a gas bag arranged in the housing, a gas generator in flow connection with the gas bag and a covering connected with the housing, which closes the housing with respect to the interior of the vehicle and is opened after activation of the gas generator in order to permit the gas bag to emerge from the housing.

Gas bag modules of this type are known in the prior art in various embodiments. The covering is usually formed by a section of the steering wheel cover or of the instrument panel, which section is provided with an articulation region and a predetermined breaking point. After activation of the gas generator, an increasing pressure is produced in the interior of both the gas bag and the housing. Since the gas bag rests against the covering, the pressure increase results in the tearing of the predetermined breaking point. The covering is bent up at a high speed so that the gas bag can emerge from the housing and completely unfold.

One disadvantage of the prior art gas bag module is that there is a risk of the covering impacting a vehicle occupant when opening. Given the mass of the covering and the high speed in which it opens, a danger exists that a vehicle occupant may be injured if contacted by the covering. Another disadvantage of the prior art gas module is that the pressure, which must be built up inside the housing for tearing open the predetermined breaking point, is high.

SUMMARY OF THE INVENTION

The invention provides a gas bag module in which the risk of a vehicle occupant being contacted by the covering during opening of the covering is reduced and in which the covering opens at a lower pressure inside the housing.

This is achieved according to the invention by a gas bag module for a vehicle occupant restraint system, having a housing adapted to be mounted beneath a vehicle instrument panel, a gas bag arranged in the housing, a gas generator in flow connection with the gas bag, a retractable covering connected with said housing, and a device for displacing the housing in a direction opposite the vehicle interior during inflation of the gas bag. The covering extends over the housing and the covering and the instrument panel form a continuous surface. The covering opens after activation of the gas generator to permit the gas bag to emerge from the housing in a direction toward the vehicle interior. The displacement of the housing opens the covering.

This design allows movement of the housing together with the covering immediately after activation of the gas generator. The housing and the covering move in a direction away from the exterior of the instrument panel on the passenger side of the vehicle in such a way that the covering opens in a region which is not accessible to the vehicle occupant. Therefore, the risk of the vehicle occupant being contacted by the covering, which is opening at a high speed, is eliminated. The movement of the housing can take place in various ways; for example, a linear drive can be provided, which is activated by means of the pressure produced after ignition of the gas generator inside the housing or which is activated separately.

Displacement of the housing opens the covering. In this way, the covering opens virtually automatically after activation of the gas generator, so that the gas bag does not have to exert any pressure onto the covering to open the predetermined breaking point.

BRIEF DESCRIPTION OF THE DRAWINGS

The foregoing and other features of the invention will become more apparent to one skilled in the art upon consideration of the following description of the invention and the accompanying drawings in which:

FIG. 5 shows a gas bag module provided with a linear drive in an initial position;

FIG. 6 shows the gas bag module of FIG. 5 with the linear drive in a retracted position;

FIG. 7 shows an alternative embodiment of the gas bag module in which a connecting element is provided;

FIG. 8 shows an alternative embodiment of the gas bag module in which a reaction element is provided; and FIG. 9 shows the gas bag module of FIG. 8 with the reaction element in a displaced condition.

DETAILED DESCRIPTION OF THE INVENTION

Figure 1:
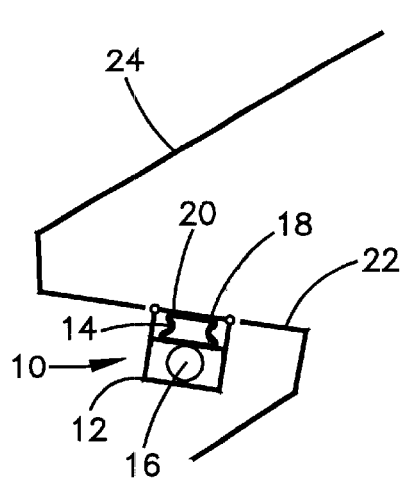
FIG. 1 shows in a diagrammatic cross-section of a gas bag module in a state of rest according to a first embodiment of the invention.

In FIG. 1, a first embodiment of a gas bag module 10 is shown. The gas bag module has a housing 12, a gas bag 14 arranged in the housing, a gas generator 16 in flow connection with the gas bag, and a covering connected with the housing, which covering consists of two parts 18, 20. The gas bag module 10 is mounted beneath an instrument panel 22, the covering formed from the parts 18, 20 being flush with the outer face of the instrument panel 22 such that the covering and the instrument panel 22 form a continuous surface.

Figure 2:
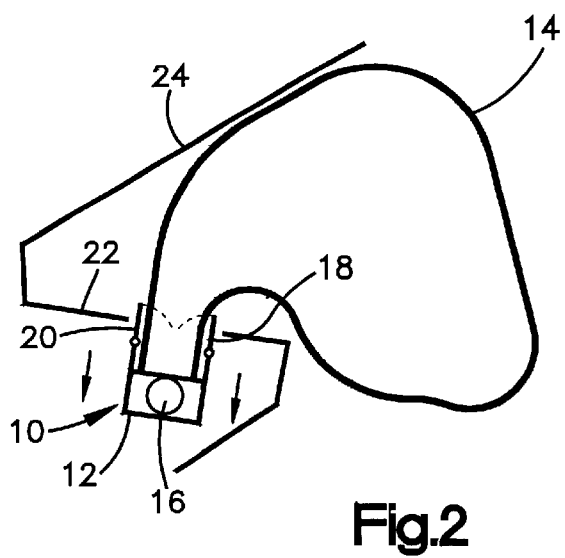
FIG. 2 shows the gas bag module of FIG. 1 after activation of the gas generator.

In FIG. 2 the gas bag module is shown after activation of the gas generator 16. It can be seen that the housing 12, together with the parts 18, 20 of the covering linked thereto, has been pushed into the interior of the instrument panel 22, i.e., in a direction opposite to the unfolding direction of the gas bag 14. The parts 18, 20 of the covering therefore open in a region which is not accessible to the vehicle occupant, so that any risk of contact between the covering and the occupant during the high speed opening of the covering is eliminated. After the covering is opened, the gas bag 14 can unfold in front of the instrument panel 22 and the windscreen 24, which is shown diagrammatically, in order to provide a restraining effect for the vehicle occupant.

The displacement of the housing 12 can take place either by an external device or by means of a reaction element. An example of an external device is a linear drive which is actuated either separately after activation of the gas generator 16 or is actuated by the compressed gas which is available inside the housing 12 after activation of the gas generator. The linear drive will be discussed in further detail below with reference to FIGS. 5–7. If a reaction element is used for the displacement of the housing, the reaction element will preferably project into the interior of the housing and will expose one of its faces to the pressure prevailing within the housing and another of its faces to an external pressure. The reaction element, which is mounted vehicle-fixed, could also be used at the same time to guide the housing during its displacement. The reaction element will be discussed in further detail below with reference to FIGS. 8–9.

Figure 3:
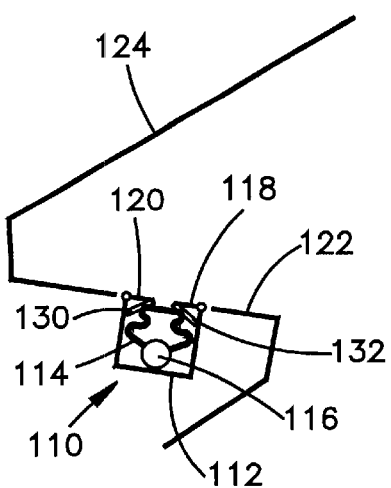
FIG. 3 shows a diagrammatic cross-section of a gas bag module in a state of rest according to a second embodiment of the invention.
Figure 4:
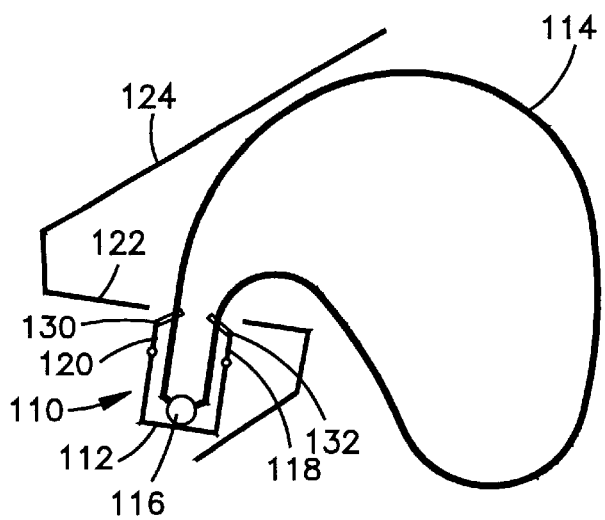
FIG. 4 shows the gas bag module of FIG. 3 after activation of the gas generator.

In FIG. 3, a gas bag module according to a second embodiment of the invention is shown. In this embodiment, the same reference numbers are used for elements which are known from FIGS. 1 and 2, increased by the number 100.

In this embodiment, as in the previous embodiments, the housing 112 of the gas bag module 110 is movably mounted on the vehicle in such a way that after activation of the gas generator 116 it is displaced in a direction opposite to the ejection direction of the gas bag 114. In addition, provision is made in this embodiment that the movement of the housing 112 is converted by a mechanism, illustrated diagrammatically as vehicle-fixed guides, or sliding guides 130, 132, into an opening movement of the covering of the gas bag, consisting of the components 118, 120. In the region of their edges, lying opposite each other, each component is swivably received in a guide 130, 132. At the opposite edge, each covering 118, 120 is coupled with the housing. The opening of the covering therefore occurs automatically, so that no pressure has to be built up inside the gas bag 114 to open the predetermined breaking point of the covering. After the covering has opened, the gas bag can unfold in front of the instrument panel 122 and the windscreen 124.

In FIGS. 5 and 6, a gas bag module is shown which is provided with a linear drive 40 having a cylinder 42. A piston 44 is displaceably arranged within the cylinder 42. The cylinder 42 is mounted in a vehicle-fixed manner. The piston 44 is connected to housing 12 by means of a piston rod 46. By supplying pressure P to the cylinder 42, piston 44 is displaced so as to retract the housing 12 from its initial position shown in FIG. 5 to a retracted position shown in FIG. 6. Pressure P can be supplied from either activation of the gas generator or from activation of an external gas generating device. FIG. 7 shows an alternative embodiment of the gas bag module in which piston rod 46 is not directly connected to housing 12 but is laterally attached thereto by means of a connecting element 50.

FIG. 8 shows an alternative embodiment in which a reaction element 60 is used. The reaction element 60 consists of a cylinder 62 in which a tube 64 is displaceably guided. The tube 64 is mounted on housing 12 and communicates with the interior of the housing. Upon actuation of the gas generator 16, the pressure developed in the interior of the housing is guided through tube 64 into cylinder 62. The pressure within the cylinder 62 causes the tube 64 to move within the cylinder 62 resulting in a downward displacement of the housing 12. FIG. 9 shows the housing 12 after being displaced by means of the reaction element.

In all embodiments of the gas bag module, a control gas bag can be provided inside the housing. The control gas bag is filled with compressed gas after activation of the gas generator, whilst preventing an inflow of compressed gas into the gas bag. The control gas bag is designed such that it is destroyed under the action of the compressed gas, when the housing is sufficiently displaced and the covering is opened, so that the compressed gas can flow into the gas bag. In this way, the gas bag is prevented from pressing against the covering which is not yet opened.

In all embodiments of the gas bag module, the housing is mounted such that it continues to be movable after the covering is opened. Therefore, the housing can be moved back into its original position in the ejection direction of the gas bag, under the action of the unfolding gas bag. This reduces, in the unfolded state, the stressing of the fabric of the gas bag around the inflation orifice. In addition, the housing can yield when, in a secondary impact with the gas bag already partially collapsed, the vehicle occupant penetrates the gas bag and hits the housing.

From the above description of the invention, those skilled in the art will perceive improvements, changes and modifications. Such improvements, changes and modifications within the skill of the art are intended to be covered by the appended claims.

Having described the invention, the following is claimed:

1. A gas bag module for a vehicle occupant restraint system, said gas bag module comprising:

a housing mounted beneath a vehicle instrument panel, a gas bag arranged in said housing, a gas generator for generating an inflation fluid, said gas generator being in flow connection with said gas bag, said gas generator, upon actuation, inflating said gas bag with said inflation fluid, a retractable covering connected with said housing, said covering extending over said housing, said covering and the instrument panel forming a continuous surface, and a device displacing said housing in its entirety in a direction opposite the vehicle interior during inflation of said gas bag, said displacement of said housing opening said covering, said covering having portions separating from each other after actuation of said gas generator to permit said gas bag to emerge through said covering and away from said housing in a direction towards a vehicle interior, said covering having portions connected to said housing which are displaced in a direction opposite the vehicle interior upon displacement of said housing.

2. The gas bag module of claim 1, wherein a pressure exerted by gas bag unfolding contributes to displacement of said housing.

3. The gas bag module of claim 1, wherein said device is activated by means of a gas pressure produced after activation of said gas generator.

4. The gas bag module of claim 3, wherein said device for displacing said housing is formed by a linear drive having a working space which is in flow connection with said gas generator.

5. The gas bag module of claim 4, wherein said linear drive is arranged outside said housing.

6. The gas bag module of claim 3, wherein said device includes a vehicle-fixed reaction element formed by a cylinder and a tube, said tube being displaceably guided within said cylinder and communicating with said housing.

7. The gas bag module of claim 1, wherein a vehicle-fixed guide is provided, said covering engaging said guide during displacement of said housing.

8. The gas bag module of claim 7, wherein said covering has a first edge region which is received in said guide and is coupled with said housing in a region of a second edge, said first edge being displaced along said guide during displacement of said housing.

9. The gas bag module of claim 1, wherein said covering comprises two components each having a longitudinal edge portion, each of said edge portions being coupled with said housing.

10. A gas bag module for a vehicle occupant restraint system, said gas bag module comprising:

a housing mounted beneath a vehicle instrument panel, a gas bag arranged in said housing, a gas generator for generating an inflation fluid, said gas generator being in flow connection with said gas bag, said gas generator, upon actuation, inflating said gas bag with said inflation fluid, a retractable covering connected with said housing, said covering extending over said housing, said covering and the instrument panel forming a continuous surface, said covering opening after actuation of said gas generator to permit said gas bag to emerge from said housing in a direction towards a vehicle interior, and a device displacing said housing in its entirety in a direction opposite the vehicle interior during inflation of said gas bag, said displacement of said housing opening said covering;

said device including a vehicle-fixed reaction element formed by a cylinder and a tube, said tube being displaceably guided within said cylinder and communicating with said housing.

11. A gas bag module for a vehicle occupant restraint system, said gas bag module comprising:

a housing mounted beneath a vehicle instrument panel, a gas bag arranged in said housing, a gas generator for generating an inflation fluid, said gas generator being in flow connection with said gas bag, said gas generator, upon actuation, inflating said gas bag with said inflation fluid, a retractable covering connected with said housing, said covering extending over said housing, said covering and the instrument panel forming a continuous surface, said covering opening after actuation of said gas generator to permit said gas bag to emerge from said housing in a direction towards a vehicle interior, and a device displacing said housing in its entirety in a direction opposite the vehicle interior during inflation of said gas bag, said displacement of said housing opening said covering;

said covering having a first edge region which is received in said guide and is coupled with said housing in a region of a second edge, said first edge being displaced along said guide during displacement of said housing.

* * * * *